United States Patent [19]

May

[11] Patent Number: 5,575,036
[45] Date of Patent: Nov. 19, 1996

[54] TABLE WHEEL

[76] Inventor: Gregory D. May, 1020 Ross Street S.E., Medicine Hat, Alberta, Canada, T1A 0Y3

[21] Appl. No.: 507,085

[22] Filed: Jul. 26, 1995

[51] Int. Cl.$^6$ .................................................. B60B 33/06
[52] U.S. Cl. ................................................. 16/34; 16/32
[58] Field of Search ................................. 16/34, 32, 33, 16/30, 29, 44, 19

[56] References Cited

U.S. PATENT DOCUMENTS

| | | | |
|---|---|---|---|
| 1,532,064 | 3/1925 | Neiswender | 16/29 |
| 1,931,446 | 10/1933 | Muller | 16/34 |
| 2,359,016 | 9/1944 | Wood | 16/34 |
| 3,879,798 | 4/1975 | Krulwich | 16/30 |
| 5,253,389 | 10/1993 | Colin | 16/34 |

FOREIGN PATENT DOCUMENTS

| | | | |
|---|---|---|---|
| 688585 | 10/1979 | U.S.S.R. | 16/34 |
| 680819 | 10/1952 | United Kingdom | 16/34 |
| 854282 | 11/1960 | United Kingdom | 16/34 |

Primary Examiner—Chuck Y. Mah

[57] ABSTRACT

A wheel for facilitating rolling of a table over a ground surface. The inventive device includes a mounting assembly for securing to a lower end of a table leg. A wheel support assembly is pivotally mounted to the mounting assembly and rotatably supports a wheel beneath the table leg. The wheel support assembly can be pivoted laterally of the table leg such that the mounting assembly engages the ground to preclude unintentional movement of the table.

4 Claims, 3 Drawing Sheets

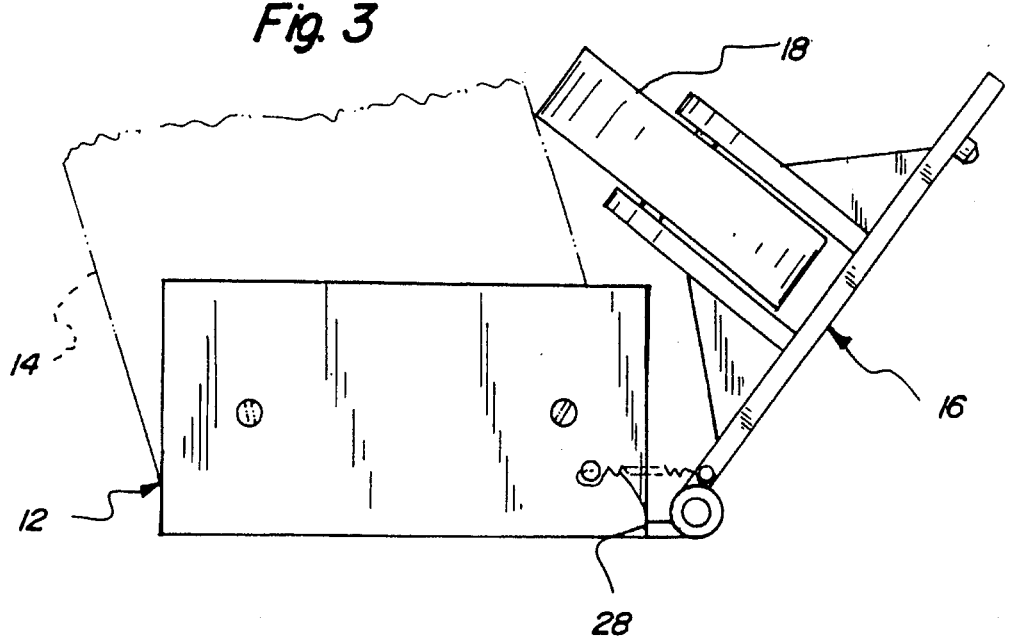
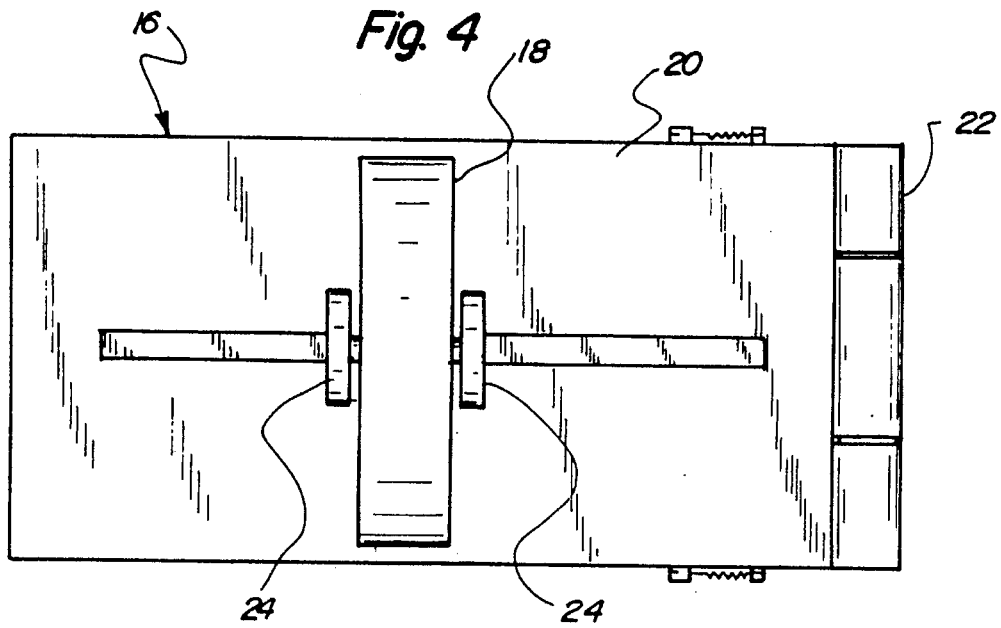

TABLE WHEEL

BACKGROUND OF THE INVENTION

1. Field of the Invention

The present invention relates to wheel structures and more particularly pertains to a table wheel for facilitating rolling of a table over a ground surface.

2. Description of the Prior Art

The use of wheel structures is known in the prior art. More specifically, wheel structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art wheel structures include U.S. Pat. Nos. 4,424,604; 3,758,918; 4,749,159; 5,308,094; 5,154,441; 5,356,197 and 4,624,468.

While these devices fulfill their respective, particular objectives and requirements, the aforementioned patents do not disclose a table wheel for facilitating rolling of a table over a ground surface which includes a mounting assembly for securing to a lower end of table leg, and a wheel support assembly pivotally mounted to the mounting assembly and rotatably supporting a wheel beneath the table leg, wherein the wheel support assembly can be pivoted laterally of the table leg such that the mounting assembly engages the ground to preclude unintentional movement of the table.

In these respects, the table wheel according to the present invention substantially departs from the conventional concepts and designs of the prior art, and in so doing provides an apparatus primarily developed for the purpose of facilitating rolling of a table over a ground surface.

SUMMARY OF THE INVENTION

In view of the foregoing disadvantages inherent in the known types of wheel structures now present in the prior art, the present invention provides a new table wheel construction wherein the same can be utilized for facilitating rolling of a table over a ground surface. As such, the general purpose of the present invention, which will be described subsequently in greater detail, is to provide a new table wheel apparatus and method which has many of the advantages of the wheel structures mentioned heretofore and many novel features that result in a table wheel which is not anticipated, rendered obvious, suggested, or even implied by any of the prior art wheel structures, either alone or in any combination thereof.

To attain this, the present invention generally comprises a wheel for facilitating rolling of a table over a ground surface. The inventive device includes a mounting assembly for securing to a lower end of a table leg. A wheel support assembly is pivotally mounted to the mounting assembly and rotatably supports a wheel beneath the table leg. The wheel support assembly can be pivoted laterally of the table leg such that the mounting assembly engages the ground to preclude unintentional movement of the table.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new table wheel apparatus and method which has many of the advantages of the wheel structures mentioned heretofore and many novel features that result in a table wheel which is not anticipated, rendered obvious, suggested, or even implied by any of the prior art wheel structures, either alone or in any combination thereof.

It is another object of the present invention to provide a new table wheel which may be easily and efficiently manufactured and marketed.

It is a further object of the present invention to provide a new table wheel which is of a durable and reliable construction.

An even further object of the present invention is to provide a new table wheel which is susceptible of a low cost of manufacture with regard to both materials and labor, and which accordingly is then susceptible of low prices of sale to the consuming public, thereby making such table wheels economically available to the buying public.

Still yet another object of the present invention is to provide a new table wheel which provides in the apparatuses and methods of the prior art some of the advantages thereof, while simultaneously overcoming some of the disadvantages normally associated therewith.

Still another object of the present invention is to provide a new table wheel for facilitating rolling a table over a ground surface.

Yet another object of the present invention is to provide a new table wheel which includes a mounting assembly for securing to a lower end of table leg, and a wheel support assembly pivotally mounted to the mounting assembly and rotatably supporting a wheel beneath the table leg, wherein the wheel support assembly can be pivoted laterally of the table leg such that the mounting assembly engages the ground to preclude unintentional movement of the table.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a further elevation view of the invention in a folded position.

FIG. 4 is a bottom plan view taken from line 4—4 of FIG. 2.

DESCRIPTION OF THE PREFERRED EMBODIMENT

Figure 1:
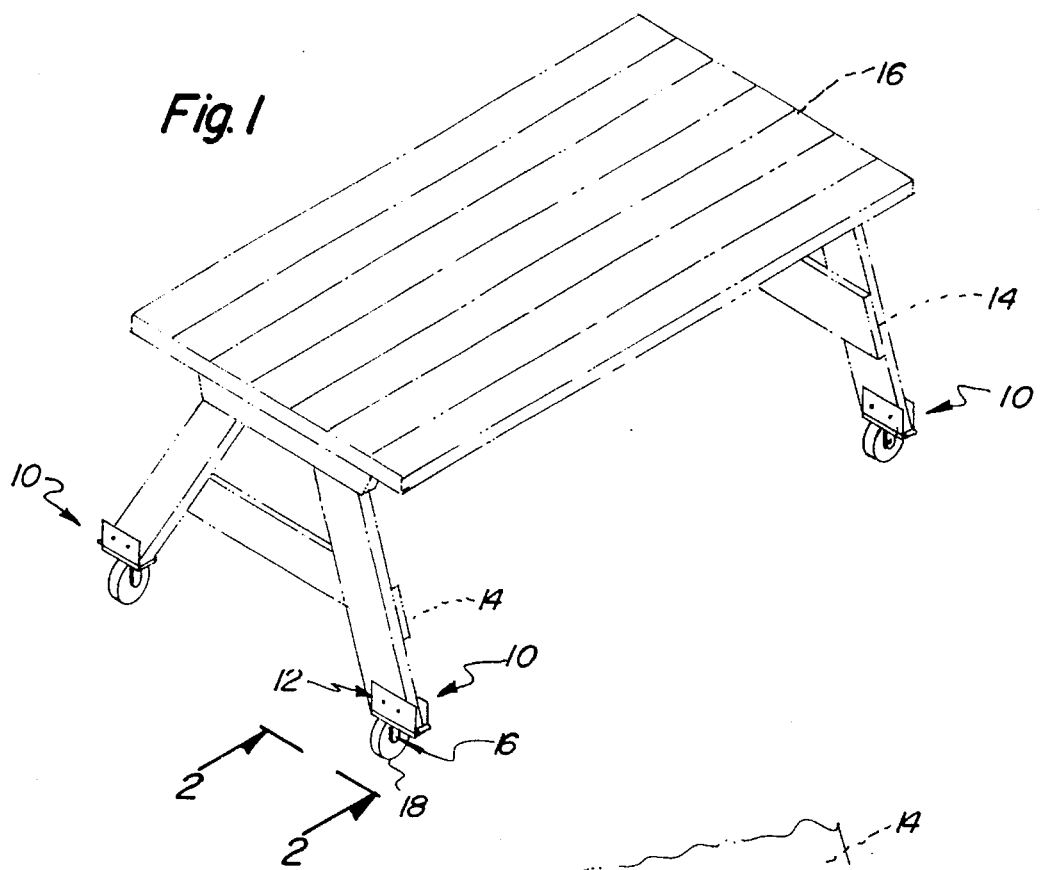
FIG. 1 is an isometric illustration of a plurality of table wheels according to the present invention in use.

With reference now to the drawings, and in particular to FIGS. 1–6 thereof, a new table wheel embodying the principles and concepts of the present invention and generally designated by the reference numeral 10 will be described.

Figure 2:
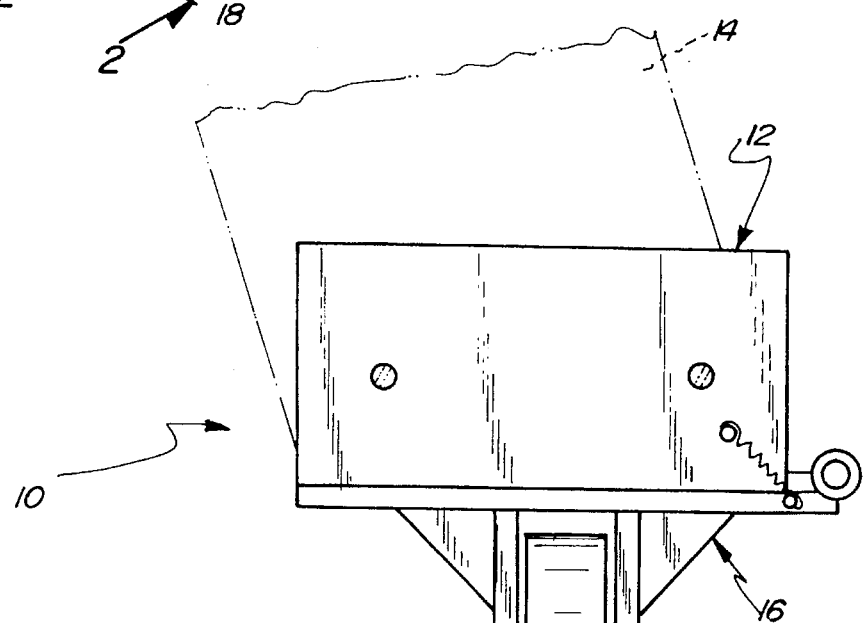
FIG. 2 is a elevation view of the invention taken from line 2—2 of FIG. 1.

More specifically, it will be noted that the table wheel 10 comprises a mounting means 12 for securing to a leg 14 of a table 16, such as the picnic table illustrated in FIG. 1 of the drawings. A wheel support means 16 is pivotally mounted to the mounting means 12 for rotatably supporting a wheel 18 relative to the mounting means. The wheel support means 16, as shown in FIGS. 2 and 3 of the drawings, is operable to support the wheel 18 beneath the mounting means 12 to facilitate rolling of the table 16 over a ground surface, and is further operable to support the wheel 18 laterally of the mounting means 12 in the folded position illustrated in FIG. 3 so as to preclude rolling of the table 16 over a ground surface. By this structure, movement of the table 16 across a ground surface and subsequent securement thereof against movement can be easily and efficiently accomplished.

Figure 5:
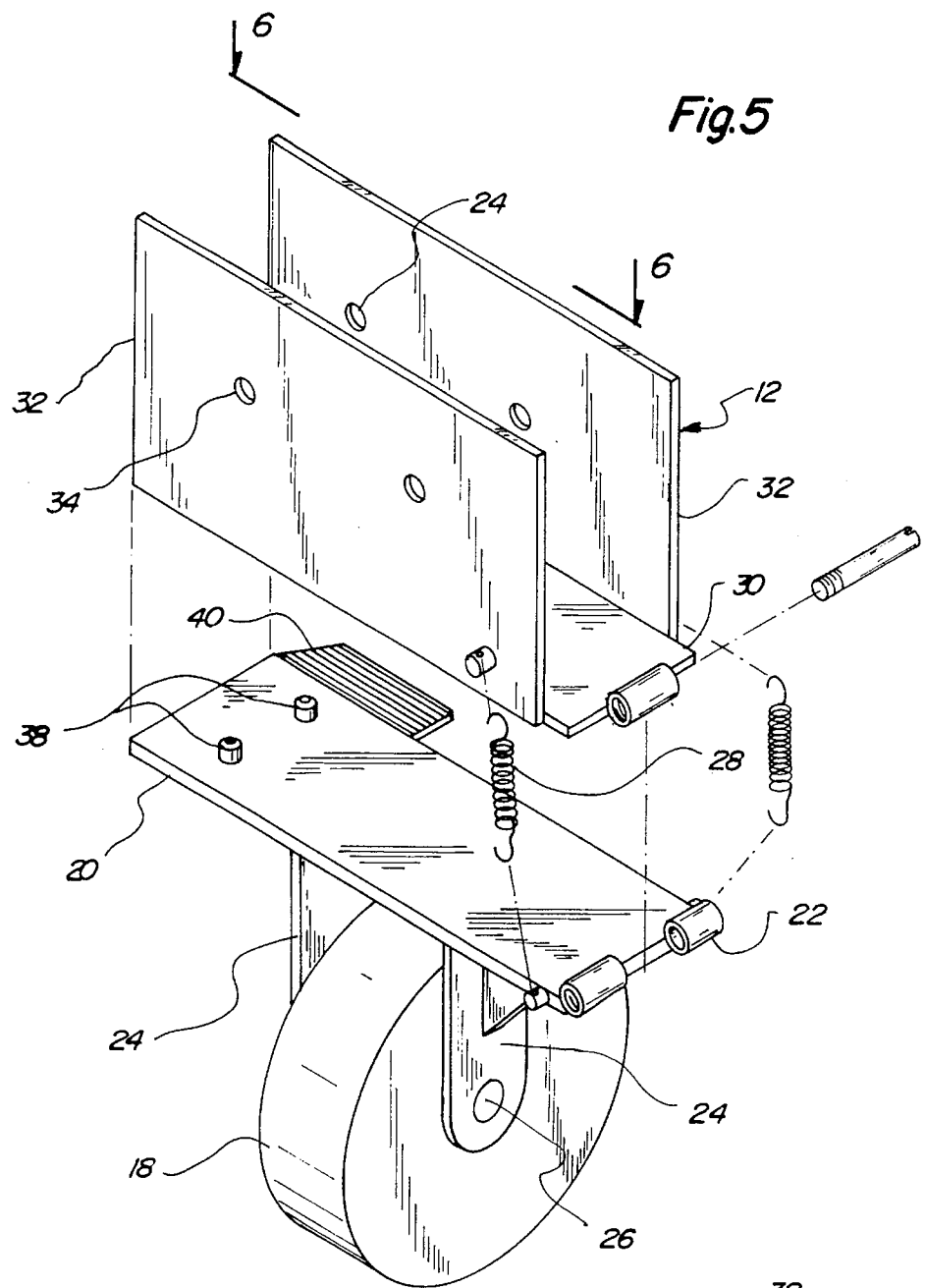
FIG. 5 is an exploded isometric illustration of the present invention.

Referring now to FIGS. 3 through 5, it can be shown that the wheel support means 16 according to the present invention preferably comprises a pivot plate 20 pivotally coupled to a transverse edge of the mounting means 12 by a hinge 22 interposed therebetween. A pair of wheel support stanchions 24 project substantially orthogonally from the pivot plate 20 in a spaced and parallel orientation. The wheel 18 is rotatably mounted between the wheel support stanchions 24 by an axle 26 directed therebetween. Preferably, a spring 28 extends between the pivot plate 20 of the wheel support means 16 and a portion of the mounting means 12 for retaining the wheel support means 16 in a desired position. By this structure, the wheel support means 16 can be positioned into the orientation illustrated in FIG. 2 so as to place the wheel 18 between a leg 14 of the table 16 and a ground surface therebeneath. Further, the wheel support means 16 can be pivoted into the orientation illustrated in FIG. 3 so as to permit direct placement of the mounting means 12 onto the ground surface to preclude unintentional movement of the table 16.

Figure 6:
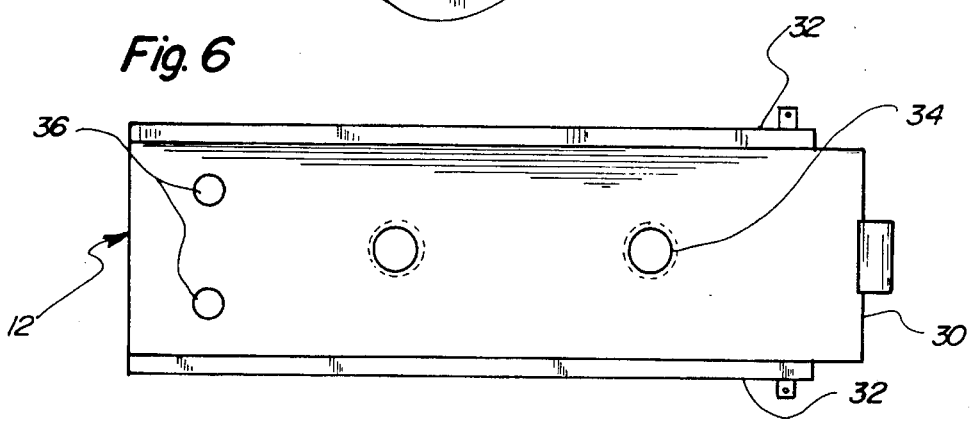
FIG. 6 is a top plan view taken from line 6—6 of FIG. 5.

Referring now to FIGS. 5 and 6, it can be shown that the mounting means 12 of the present invention 10 preferably comprises a substantially rectangular end plate 30 having spaced and parallel longitudinal edges and spaced and parallel transverse edges extending substantially orthogonally between the longitudinal edges so as to define a substantially rectangular shape of the end plate 30. The hinge 22 is thus mounted to one of the transverse edges of the end plate 30 as shown in FIGS. 2 and 3 of the drawings. A pair of mounting plates 32 extend in a substantially spaced and parallel orientation from the respectively opposed longitudinal edges of the end plate 30. The mounting plates 32, as well the end plate 30, are each shaped so as to define at least one mounting aperture 34 directed therethrough permitting the projection of threaded fasteners or the like therethrough and into the associated leg 14 of the table 16 so as to permit coupling of the device relative thereto. By this structure, the mounting means 12 can be easily positioned over a lower end of a leg 14 of a table 16, whereby a direction of fasteners or the like through the mounting apertures 34 will effect securement of the mounting means 12 to the leg.

As best illustrated in FIGS. 5 and 6, it can be shown that the end plate 30 of the mounting means 12 is preferably shaped so as to define at least one guide aperture 36 directed therethrough which receives at least one guide pin 38 projecting from the pivot plate 20. Preferably, the end plate 30 is shaped so as to define a pair of spaced guide apertures 36 which each receive an individual one of a pair of guide pins 38 projecting from the pivot plate 20. The guide pins 38 serve to reduce moment forces transferred to the hinge 22 during rolling of the table 14 over a ground surface. To facilitate ease of pivoting of the wheel support means 16 relative to the mounting means 12, the pivot plate 20 is desirably shaped so as to include a foot plate 40 projecting from a longitudinal edge thereof which can be engaged by a human foot or other limb to effect pivoting of the pivot plate 20 against a force of the spring 28 and into the position illustrated in FIG. 3 of the drawings. The foot plate 40 is then further operable to facilitate pivoting of the wheel support means 16 back into the position illustrated in FIG. 2 of the drawings when it is desired to roll the table 16 across a ground surface.

In use, the table wheel 10 according to the present invention can be easily secured to a leg 14 of an associated table 16. Securement of a plurality of the table wheels to individual legs 14 of a table 16 permits the table 16 to be rolled over a ground surface and into a desired orientation, whereby the wheel support means 16 can then be pivoted laterally of the mounting means 12 to allow the mounting means to rest upon the ground surface, thereby precluding further motion of the table 16 relative thereto.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A table wheel comprising:

a wheel;

a mounting means for securing to a leg of a table, said mounting means comprising a substantially rectangular end plate having spaced and parallel longitudinal edges and spaced and parallel transverse edges extending substantially orthogonally between the longitudinal edges so as to define a substantially rectangular shape of the end plate, a pivot plate being pivotally mounted to one of the transverse edges of the end plate; and a pair of mounting plates extending in a substantially spaced and parallel orientation from the respectively opposed longitudinal edges of the end plate, the mounting plates each shaped so as to define at least one mounting aperture directed therethrough; and, a wheel support means mounted to the mounting means for rotatably supporting the wheel in either a first position beneath the mounting means and a second position lateral of the mounting means, wherein the wheel support means comprises a pair of wheel support stanchions protecting substantially orthogonally from the pivot plate in a spaced and parallel orientation, the wheel being rotatably mounted between the wheel support stanchions; and a spring extending between the pivot plate and a portion of the mounting plates.

2. The table wheel of claim 1, wherein the end plate of the mounting means is shaped so as to define a guide aperture directed therethrough; and further comprising at least one guide pin projecting from the pivot plate which is received within the guide aperture of the end plate.

3. The table wheel of claim 2, wherein the pivot plate is shaped so as to define a foot plate projecting from a longitudinal edge thereof.

4. The table wheel of claim 3, wherein the mounting means further comprises fasteners directed through the mounting apertures of the mounting plates for mounting said mounting plates to a leg of a table.

\* \* \* \* \*